March 26, 1968    W. E. SINNER    3,375,314
ELECTRODE FOR GLASS MELTING FURNACES
Filed Oct. 8, 1964
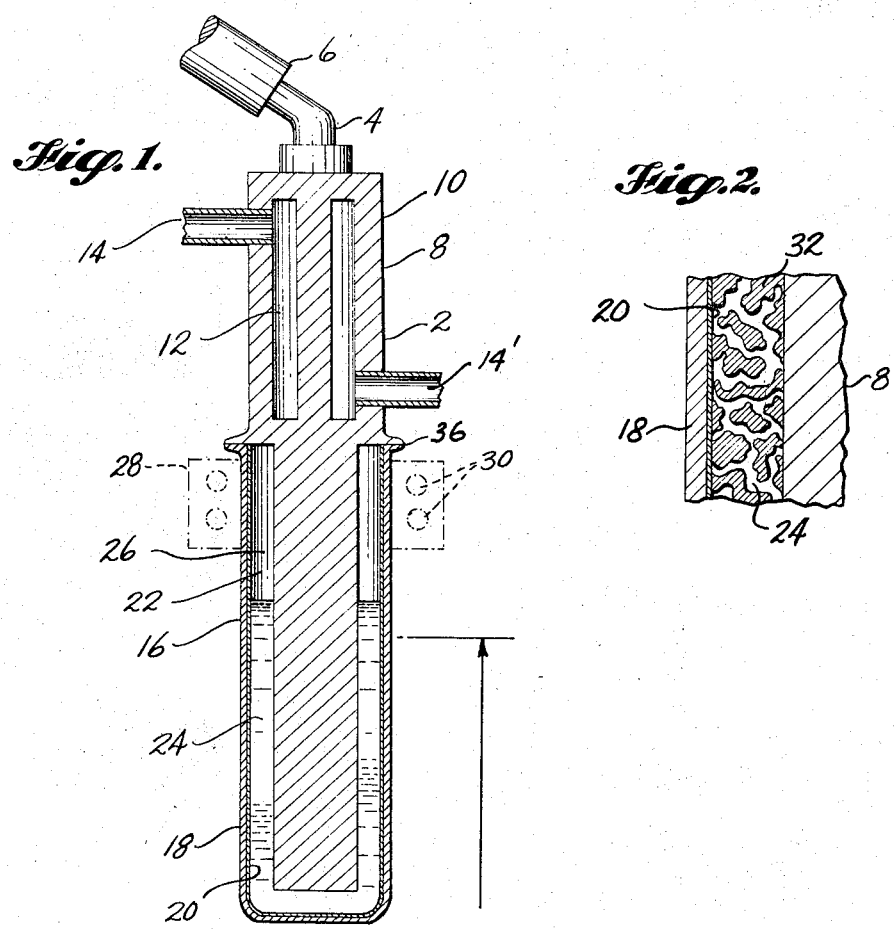
INVENTOR.
WOODROW E. SINNER
BY
AGENT _United States Patent Office_

3,375,314
Patented Mar. 26, 1968

3,375,314
ELECTRODE FOR GLASS MELTING FURNACES
Woodrow E. Sinner, Vashon, Wash., assignor to The Boeing Company, Seattle, Wash., a corporation of Delaware
Filed Oct. 8, 1964, Ser. No. 402,413
9 Claims. (Cl. 13—6)

This invention relates to glass melting furnaces of the kind in which the glass is maintained in the molten state by the passage therethrough of an electric heating current, communicated to the glass by immersed electrodes; and more particularly relates to the electrode construction for use in such furnaces.

The term glass is to be deemed to include vitreous materials generally.

The property of glass of being electrically conductive when molten is well known and, in this condition it will conduct enough current to cause sufficient heating to keep the glass molten. The biggest problem is an electrode through which to apply the electric current. Temperatures are high enough to melt many materials, and other materials dissolve in the molten glass, thus destroying the electrode and contaminating the melt. Existing electrodes used in the prior art have a very short life and are made from materials which oxidize and some contaminate the melt. Also the combination of the materials used in the structure of some of these electrodes, are subjected to damaging stresses at the various environmental temperatures.

Because the present invention provides a longer lasting electrode, frequent replacing and readjusting of electrodes is eliminated. Contamination of the glass melt and destruction of the electrode are both avoided by the unique structural arrangement of the various materials and their respective properties. Furthermore, the electrode is stress-free in the temperature range to which it is exposed.

The present disclosed electrode employing bismuth as shown and explained hereinafter provides a self temperature limiting feature.

When positioned in the furnace the electrode does not burn up and will stay in its proper location which is not so with molybdenum electrodes which oxidize while in use and require frequent readjustment.

It is therefore an object of the present invention to provide an electrode which is so constructed that internal stresses between the several materials are made negligible at the various temperatures encountered.

It is a further object of this invention to provide an electrode, which is built from materials which do not oxidize and thus prevent contamination of the melt.

It is another object of the present invention to provide an electrode assembled from various materials which do not change their individual properties and thus offer a long life and therefore offer a more economical use.

It is another object of the present invention to provide an electrode which maintains the electrical carrying capacities at all times.

Furthermore, this invention provides other objects, features and advantages which will become fully apparent from the following detailed description taken in conjunction with the accompanying drawings which illustrate and clarify the preferred embodiment of this device.

FIGURE 1 illustrates a cross section of the preferred embodiment and structural arrangement of the electrode.

FIGURE 2 illustrates a cross section of a detailed portion of the electrode wherein an additional material is inserted between the inside body of the electrode and its outside shell.

In general the present invention combines the protective effect of platinum with the refractory qualities of molybdenum while:

(1) using a minimum of platinum, (2) maintaining the current carrying capacity of the electrode,
(3) deleting most of the thermal stresses associated with the assembly of different materials and,
(4) circumventing the cladding or coating problem of the molybdenum main body.

These characteristics save critical and expensive materials, increase the ease of manufacturing and prolong the useful life of the electrode.

Referring now to FIGURE 1, the electrode 2 is connected through an electrical connecting device 4 to an electrical current carrying lead 6. The electrode 2 has a main body 8 made of molybdenum and its top section 10 is provided with a passage 12 which has an inlet 14 and an outlet 14' to enable circulation of a cooling fluid through the top section 10 of the molybdenum main bdoy 8.

The bottom section 16 of the molybdenum body 8 is provided with a shell or sheath 18 of platinum, coated inside with iridium or ruthenium 20. The space 22 between the main body 8 and the platinum sheath 18 is partly filled with bismuth 24 and the rest of the space 22 is evacuated or charged with a relatively inactive gas 26. The purpose of the gas or vacuum is to prevent oxidation. The gas is an optional means of regulating the pressure over the molten bismuth operating temperatures.

An optional cooling structure 28 provided with passages 30 for the circulation of a cooling fluid is shown to surround the upper part of the platinum sheath 18.

FIGURE 2 shows an arrangement for providing structural support between the sheath of platinum 18 and the molybdenum main body 8. A refractory sponge-like or core material 32 sustains the sheath of platinum 18 with respect to the main body 8, while using a material such as bismuth 34 unrestrictedly disposed within the core material 32.

Having now described the different parts of this invention by reference numbers, the operation of the device is as follows:

The electrode 2 is constructed of a main body 8 of molybdenum and provided with passages 12 to allow a cooling fluid to circulate therethrough and to keep the top section 10 of the electrode 2 at a temperature well below the point at which the destructive oxidation of the molybdenum occurs. Molybdenum is chosen because of its high melting point of 4700° F.

The bottom section of the electrode 2 is constructed in a different manner. The electrode 2 is covered with a platinum shell 18 having a thickness of approximately 0.005 to 0.025 of an inch, which is chosen for its high resistance to the deteriorating effect of most molten glasses.

Molybdenum, with its 4700° F. melting point, would not melt; however, it must be protected against rapid oxidation above 930° F. which occurs at the glass-air interface. A direct cladding of the molybdenum with platinum which would prevent oxidation of the aforementioned interface, is very difficult and usually unsatisfactory. Other protective coatings eventually fail through thermal degradation, oxygen diffusion, cracking and spalling. To solve the problem at the glass-air interface and to avoid the problem of cladding, the present electrode presents only a platinum surface at the glass-air interface. This platinum sheath 18 is mounted to the molybdenum 8 by brazing at the ring 36. In order to connect the platinum 18 electrically to the molybdenum body 8, an intermediate material is used which consists of bismuth 24.

The bismuth 24 has the property of becoming molten above 520° F. and still furnishing a good electrical path from the main body 8 to the shell or sheath of platinum 18 and then to the melt, thereby also allowing free motion of the shell 18 and the main body 8 with respect to one another at the various temperatures encountered. The result is no stress due to differential thermal expansion. A ruthenium or iridium coating 20 applied to the inside of the platinum shell 18 prevents premature deterioration of the platinum shell 18 through the attack of the molten bismuth 24.

The relatively long transition zone in which the massive body goes from a temperature near that of the melt to that of the cooled portion is completely protected by the platinum sheath 18 and its controlled atmosphere and suffers no oxidation damage.

The bismuth vapor pressure in the annulus or space 26 will depend upon the temperature, being less than 1 atmosphere below 2588° F. Below the boiling point of bismuth, the bismuth vapor would slowly condense on the cooler parts of the body 8 and shell 18. Above the boiling point of the bismuth 24, this condensation would result in appreciable heat transfer and consequent cooling effect, which tends to stabilize the bismuth 24 temperature, and as a result stabilizes the electrode temperature.

An optional or supplemental cooling coil 28 having a coolant flow which is separately controlled, would provide a means for controlling the condensation of bismuth 24 when operating near its boiling point. However, most commercial glasses are sufficiently fluid for most manufacturing processes at a temperature well below the boiling point of bismuth.

The use of lead instead of bismuth would provide substantially similar characteristics as far as this invention is involved and thus can be considered as being an equivalent material.

Various other structural modifications of the invention may be contemplated by those skilled in the art without departing from the spirit and scope of the invention as hereinafter defined by the appended claims.

I claim:
1. An electrode for sustaining glass or the like in a molten condition comprising in combination:
   (a) an elongated body having an upper, middle, and bottom section,
   (b) said upper section provided with electrical connecting means and cooling means,
   (c) said bottom section enveloped with a shell of platinum mounted on said middle section in liquid tight relationship and being in spaced relationship with said bottom section, thus forming an enclosed space, and
   (d) said enclosed space being partly filled with bismuth and its remaining space being a vacuum.
2. An electrode for sustaining glass or the like in a molten condition comprising in combination:
   (a) an elongated body of molybdenum having an upper, middle and bottom section,
   (b) said upper section provided with an electrical connecting device and cooling means,
   (c) said bottom section enveloped with a shell of platinum coated with iridium on its inside surface, said shell being mounted, in liquid tight relationship on said middle section and is spaced in relationship with said bottom section, thus forming an enclosed space,
   (d) said enclosed space being partly filled with bismuth and its remaining space evacuated of air.
3. An electrode for sustaining glass or the like in a molten condition as claimed in claim 2, wherein said enclosed space is provided with a core material for supporting said shell in relationship to said bottom section and wherein said core material provides free circulation of said bismuth therethrough when said bismuth is in a molten condition.
4. An electrode for sustaining glass or the like in a molten condition comprising in combination:
   (a) an elongated body of molybdenum having an upper, middle and bottom section,
   (b) said upper section provided with an electrical connecting device and cooling means,
   (c) said bottom section enveloped with a shell of platinum coated with iridium on its inside surface, said shell being mounted, in liquid tight relationship on said middle section and in spaced relationship with said bottom section, thus forming an enclosed space,
   (d) said enclosed space being partly filled with lead and its remaining space evacuated of air.
5. An electrode for sustaining glass or the like in a molten condition as claimed in claim 2, wherein said enclosed space is provided with a core material for supporting said shell in relationship to said bottom section and wherein said core material provides free circulation of said lead therethrough when said lead is in a molten condition.
6. An electrode for sustaining glass or the like in a molten condition comprising in combination:
   (a) an elongated body of molybdenum having an upper, middle and bottom section,
   (b) said upper section provided with an electrical connecting device and cooling means,
   (c) said bottom section enveloped with a shell of platinum coated with ruthenium on its inside surface, said shell being mounted in liquid tight relationship on said middle section and in spaced relationship with said bottom section thus forming an enclosed space,
   (d) said enclosed space being partly filled with bismuth and its remaining space evacuated of air.
7. An electrode for sustaining glass or the like in a molten condition comprising in combination:
   (a) an elongated body of molybdenum having an upper, middle and bottom section,
   (b) said upper section provided with an electrical connecting device and cooling means,
   (c) said bottom section enveloped with a shell of platinum coated with iridium on its inside surface, said shell being mounted, in liquid tight relationship on said middle section and in spaced relationship with said bottom section thus forming an enclosed space, and
   (d) said enclosed space being partly filled with lead and its remaining space filled with inactive gas.
8. An electrode for sustaining glass or the like in a molten condition comprising in combination:
   (a) an elongated body of molybdenum having an upper, middle and bottom section,
   (b) said upper section provided with an electrical connecting device and cooling means,
   (c) said bottom section enveloped with a shell of platinum coated with ruthenium on its inside surface, said shell being mounted, in liquid tight relationship on said middle section and in spaced relationship with said bottom section thus forming an enclosed space, and
   (d) said enclosed space being partly filled with lead and its remaining space filled with inactive gas.
9. An electrode for sustaining glass in a molten condition as claimed in claim 8 wherein said enclosed space is provided with a refractory core material for supporting said shell with respect to said molybdenum body and wherein said material provides free circulation of said lead when said lead is in molten condition.

References Cited

UNITED STATES PATENTS 2,749,379  6/1956  Geffcken et al. _____ 13—34

FOREIGN PATENTS 692,442  6/1953  Great Britain.
731,405  6/1955  Great Britain.
769,428  3/1957  Great Britain.

BERNARD A. GILHEANY, *Primary Examiner.*

H. B. GILSON, *Assistant Examiner.*